US011124217B2

(12) United States Patent
Zhao et al.

(10) Patent No.: US 11,124,217 B2
(45) Date of Patent: Sep. 21, 2021

(54) UNIVERSAL CONSTRUCTION STROLLER

(71) Applicant: BRITAX CHILD SAFETY, INC., Fort Mill, SC (US)

(72) Inventors: Jie Zhao, Charlotte, NC (US); Joel Hyrum Bennett, Clover, SC (US); Brandon Cory Hoover, Cornelius, NC (US); Michael E. Calvert, Lake Wylie, SC (US)

(73) Assignee: Britax Child Safety, Inc., Fort Mill, SC (US)

( * ) Notice: Subject to any disclaimer, the term of this patent is extended or adjusted under 35 U.S.C. 154(b) by 0 days.

(21) Appl. No.: 16/211,688

(22) Filed: Dec. 6, 2018

(65) Prior Publication Data

US 2019/0210628 A1   Jul. 11, 2019

Related U.S. Application Data

(60) Provisional application No. 62/595,286, filed on Dec. 6, 2017.

(51) Int. Cl.
| | |
|---|---|
| *B62B 7/06* | (2006.01) |
| *B62B 9/20* | (2006.01) |
| *B62B 9/28* | (2006.01) |
| *B62B 9/26* | (2006.01) |
| *B62B 7/00* | (2006.01) |

(52) U.S. Cl.
CPC ............... *B62B 7/06* (2013.01); *B62B 7/008* (2013.01); *B62B 9/20* (2013.01); *B62B 9/26* (2013.01); *B62B 9/28* (2013.01); *B62B 2202/42* (2013.01)

(58) Field of Classification Search
CPC .. B62B 7/06; B62B 7/008; B62B 9/20; B62B 9/28
See application file for complete search history.

(56) References Cited

U.S. PATENT DOCUMENTS

| 6,302,421 | B1 * | 10/2001 | Lee | A61G 5/023 280/210 |
|---|---|---|---|---|
| 6,644,739 | B2 * | 11/2003 | Brown | B62B 9/28 280/47.4 |
| 6,666,470 | B2 * | 12/2003 | Li | B62K 9/02 280/272 |
| 8,282,119 | B1 * | 10/2012 | Caksa | B62B 7/008 280/642 |

(Continued)

FOREIGN PATENT DOCUMENTS

| CA | 2820907 A1 | 1/2014 |
|---|---|---|
| FR | 3048401 A1 | 9/2017 |
| WO | 2010065884 A1 | 6/2010 |

OTHER PUBLICATIONS

Office Action issued in corresponding Canadian application No. 3,025,155 dated Nov. 18, 2019, all enclosed pages cited.

*Primary Examiner* — Erez Gurari
(74) *Attorney, Agent, or Firm* — K&L Gates, LLP

(57) ABSTRACT

A stroller assembly may be configurable as an assembled stroller having selected components defining one of a plurality of potential stroller configurations. The stroller assembly may include a plurality of constituent assemblies. Each of the constituent assemblies may include a plurality of selectable components that, when selected and combined into the assembled stroller, define a corresponding expression of the stroller assembly.

19 Claims, 12 Drawing Sheets

(56) References Cited

U.S. PATENT DOCUMENTS

| | | | | |
|---|---|---|---|---|
| 8,607,945 | B2* | 12/2013 | Kawalit | A45C 5/14 |
| | | | | 190/115 |
| 9,114,842 | B2* | 8/2015 | Bartels | B62H 7/00 |
| 9,789,893 | B2* | 10/2017 | Young | B62B 7/12 |
| 9,950,729 | B2* | 4/2018 | Choi | B62B 7/06 |
| 10,279,831 | B2* | 5/2019 | Huang | B62B 7/062 |
| 10,414,422 | B2* | 9/2019 | Choi | B62B 7/06 |
| 2007/0075525 | A1 | 4/2007 | Nolan et al. | |
| 2009/0194957 | A1* | 8/2009 | Schneegans | B62B 7/10 |
| | | | | 280/31 |
| 2013/0106078 | A1 | 5/2013 | Li | |
| 2015/0217792 | A1* | 8/2015 | Stiba | B62B 7/008 |
| | | | | 280/650 |
| 2015/0232114 | A1 | 8/2015 | Gillett | |
| 2016/0229441 | A1* | 8/2016 | Laffan | B62B 7/008 |
| 2019/0217879 | A1* | 7/2019 | Gibson | B62B 7/008 |

* cited by examiner

UNIVERSAL CONSTRUCTION STROLLER

CROSS REFERENCE TO RELATED APPLICATIONS

This application claims priority to U.S. application No. 62/595,286 filed Dec. 6, 2017, the entire contents of which are hereby incorporated by reference in its entirety.

TECHNICAL FIELD

Exemplary embodiments of the present disclosure generally relate to a stroller assembly, and more particularly, to a stroller assembly configured to be assembled from any of a plurality of parts that are universally employed in multiple different assembled stroller configurations or models.

BACKGROUND

In general, strollers are wheeled devices used to transport a passenger, typically a child or infant. Many stroller manufacturers may manufacture a variety of types of stroller such as, for example, a three-wheel single-seat stroller, a four-wheel single-seat stroller, a three-wheel double-seat stroller, or a four-wheel double-seat stroller. Even within the same type of stroller, different expressions of brand language may call for entirely different constructions and/or components. Thus, the variety of types or configurations of strollers designed or manufactured by the same stroller manufacturer are often assembled from components that are only used with one of the manufacturer's stroller designs. In other words, components used for a specific stroller design may not be configured to be used in any (or many) other stroller design or configuration manufactured by the stroller manufacturer. Because the multiple strollers manufactured by the same stroller manufacturer may all have a non-uniform design, the manufacturer may need to expend a significant amount of time and capital in separately designing components for each stroller configuration in order to meet the needs of their customers. Additionally, the non-uniform design may lead to customer confusion as the customer cannot tell based on the stroller design who manufactured the stroller.

BRIEF SUMMARY OF SOME EXAMPLES

Some example embodiments may provide for a stroller assembly that may be configured in multiple different configurations from the same basic set of components, parts and pieces. Thus, rather than a stroller manufacturer having to expend extra time and capital designing separate components for each stroller design or configuration they manufacture, a universal stroller assembly of an example embodiment as described herein may enable the manufacturer to assemble multiple stroller designs or configurations from the same set of components.

In one example embodiment, a stroller assembly is provided. The stroller assembly may be configurable as an assembled stroller having selected components defining one of a plurality of potential stroller configurations. The stroller assembly may include a plurality of constituent assemblies. Each of the constituent assemblies may include a plurality of selectable components that, when selected and combined into the assembled stroller, define a corresponding expression of the stroller assembly.

In another example embodiment, a method of assembling a stroller assembly into a stroller is provided. The method may include selecting, for one or more of a plurality of constituent assemblies of the stroller assembly, individual instances of components among a plurality of selectable components associated with the one or more of the plurality of constituent assemblies; and combining all constituent assemblies into the assembled stroller to define a corresponding expression of the stroller assembly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
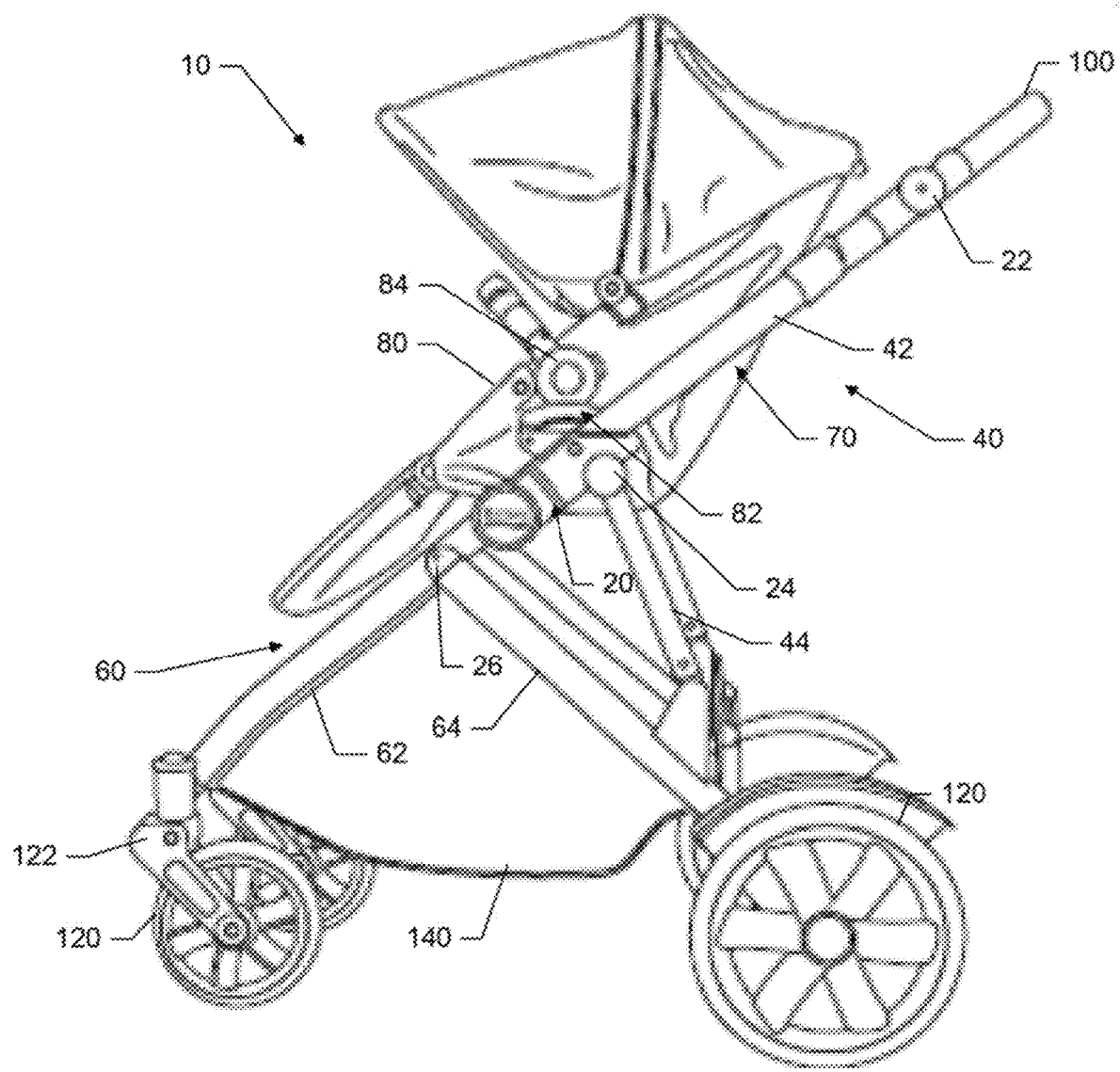
FIG. 1 illustrates a side perspective view of an assembled stroller in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As discussed above, some example embodiments may provide for a universal construction stroller assembly that may be configured in multiple different stroller configurations. Thus, a stroller manufacturer may be able to design and manufacture a family of strollers all having a uniform set of basic components from which each respective design is selectively configured. This family of strollers may include a variety of configurations of three-wheel and four-wheel strollers all assembled from the components of one universal construction stroller assembly. Accordingly, the stroller manufacturer may save time and money while also creating a family of strollers that can be configured to any desirable expression of brand or design language that can still be easily recognizable by the customer as being from the same stroller manufacturer.

By allowing the designer to select from what is essentially a kit of interconnecting parts, example embodiments may give the designer great power to generate different designs for strollers all from the same design language, and having similar overall looks, while at the same time catering to specific needs of varying stroller market segments. In this regard, aspects such as the varying of link lengths and pivot points or making various other changes (e.g., by adding extensions to existing tubes, changing widths, altering cross sections, materials, thicknesses, etc.) can be made both variable, yet consistent, across a large number of potential designs. The mechanisms by which strollers fold, unfold, add accessories, change certain characteristics, etc., may therefore be controlled and changed while based on the alterations that can be made to individual modules (or constituent assemblies) of the stroller. Locking elements, wheel types (or sizes), handle articulation joints (e.g., pivoting, telescoping, both), wheel braking mechanisms, caster wheels, bearings, wheel release joints etc., may all be variable factors within a consistent design language.

FIG. 1 illustrates a side-view of an example embodiment of an assembled stroller 10. In this regard, the assembled stroller 10 demonstrated in FIG. 1 may be an example of a stroller designed and manufactured by a stroller manufacturer. As shown in FIG. 1, the stroller 10 may include an upper frame 40 and a lower frame 60 operably coupled together by a first hinge assembly 20. A first seat 80 may be supported by the upper frame 40 of the stroller 10 and disposed within a receiving space 70 defined between components of the upper frame 40. As shown in FIG. 1, the first seat 80 may be removably coupled to the upper frame 40 by a socket 82 operably coupled to the upper frame 40. In this regard, the first seat 80 may include a latch 84 (or insert) configured to plug into and out of the socket 82 to removably couple the first seat 80 to the stroller 10. The first seat 80 may enable a child or infant to sit therein and be transported by the stroller 10. It should be understood that in other strollers 10 of an example embodiment may be configured such that the first seat 80 is coupled to the upper frame 40 in a manner such that the first seat 80 is not configured to be removed from the stroller 80 (e.g., a portion of the first seat 80 may be coupled directly to the upper frame 80). Furthermore, in other example embodiments the first seat 80 may be configured to be operably coupled to the upper frame 40 or the lower frame 60 or combination thereof.

In an example embodiment, the stroller 10 may include a handle 100 operably coupled to an end of the upper frame 40. The handle 100 may enable the steering and driving of the stroller 10 by a user of the stroller 10. The handle 100 may include levers, triggers, or like to enable the braking or folding of the stroller 10 from the handle 100 of the stroller 10. In some cases, the handle 100 may be operably coupled to the upper frame 40 by a second hinge assembly 22. This second hinge assembly 22 may be identical or different than the first hinge assembly 20 operably coupling the upper frame 40 to the lower frame 60.

In some cases, the upper frame 40 of the stroller 10 may include a front upper frame portion 42 and a rear upper frame portion 44. The front upper frame portion 42 and the rear upper frame portion 44 may be operably coupled by a third hinge assembly 24. This third hinge assembly 24 may be identical or different than the first hinge assembly 20 and/or the second hinge assembly 22. As mentioned above, the upper frame 40 may be configured to support, at least in part, the first seat 80 of the stroller 10.

Furthermore, the lower frame 60 of the stroller 10 may include a front lower frame portion 62 and a rear lower frame portion 64. The front lower frame portion 62 and the rear lower frame portion 64 may be operably coupled by a fourth hinge assembly 26. The fourth hinge assembly 64 may be identical or different than the first hinge assembly 20, the second hinge assembly 22, or the third hinge assembly 24. As shown in FIG. 1, the lower frame 60 may be configured to support a storage compartment 140 of the stroller 10. Furthermore, in some example embodiments, the lower frame 60 may also be configured to support a second seat 90 of the stroller 10 if included (see FIG. 11).

As further shown in FIG. 1, at least one wheel 120 may be operably coupled to the front lower frame portion 62, and at least one wheel 120 may be operably coupled to the rear lower frame portion 64. The wheels 120 of the stroller 10 may be each be operably coupled to the lower frame 60 via a wheel support 122. The wheel support 122 may be configured to couple the wheel 120 to an end of the lower frame 60 in any way known to a person of skill in the art. The embodiment illustrated in FIG. 1 demonstrates a pair of front wheels 120 attached to opposing sides of the front lower frame portion 62, and a pair of rear wheels 120 attached to opposing sides of the rear lower frame portion 64. It should be understood, however, that some strollers configurations may include only one wheel 120 attached to the front lower frame portion 62.

As mentioned above, the stroller 10 may include a first hinge assembly 20, a second hinge assembly 22, a third hinge assembly 24, and a fourth hinge assembly 26. The operation of the hinge assemblies 20, 22, 24, and 26 may enable the folding and unfolding (e.g., pivoting, swiveling, rotating, or articulating) of the components that the hinge assemblies 20, 22, 24, and 26 operable couple relative to each other. In this regard, the operation of the first hinge assembly 20 may enable the upper frame 40 to fold relative to the lower frame 60 or vice versa in order to allow for the folding and unfolding of the stroller 10. Furthermore, the operation of the second hinge assembly 22 may enable the handle 100 to be folded relative to the upper frame 40. In some cases, the handle 100 may be configured to fold about an axis defined by the second hinge assembly 22. Accordingly, the handle 100 may be moved up or down relative to the upper frame 40. In some cases, the stroller 10 may include additional hinge assemblies such as the third hinge assembly 24 and the fourth hinge assembly 26. The operation of the third hinge assembly 24 and the fourth hinge assembly 26 may the further enable the collapsing or folding of the components of the upper frame 40 relative to the lower frame 60. The hinge assemblies 20, 22, 24, and 26 may be configured in accordance with any hinge design known to one of ordinary skill in the art. For example, the hinge assemblies 20, 22, 24, and 26 may be configured in accordance with a hinge demonstrated in U.S. Pat. Nos. 9,637,154, 9,566,995, or the like that could be employed in connection with various example embodiments.

While only one side of the stroller 10 is clearly visible in FIG. 1, it should be understood that components of the stroller 10 may be duplicated on a side of the stroller 10 located farther away from the viewer in FIG. 1. Furthermore, while the stroller 10 demonstrated in FIG. 1 is an example of a stroller having four wheels, it should be appreciated that this stroller 10 is only one example embodiment of a stroller that may be assembled using the stroller assembly described below. Other example strollers that may be assembled using the stroller assembly described below, may include three wheel strollers or other four wheeled strollers. Thus, the stroller 10 of FIG. 1 should be appreciated as merely being example of a stroller that may employ an example embodiment.

Figure 2:
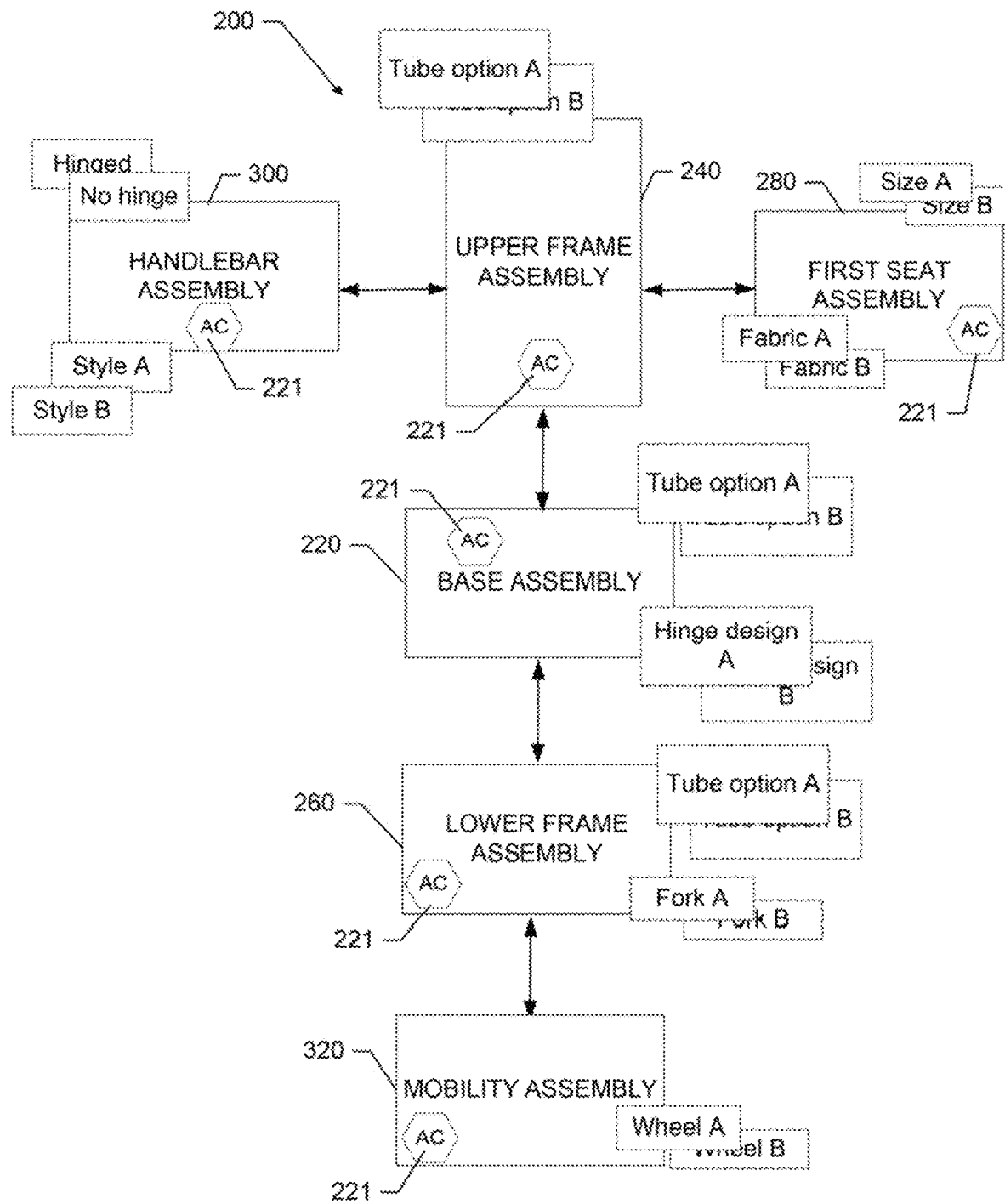
FIG. 2 illustrates a block diagram of a stroller assembly in accordance with an example embodiment.
Figure 3:
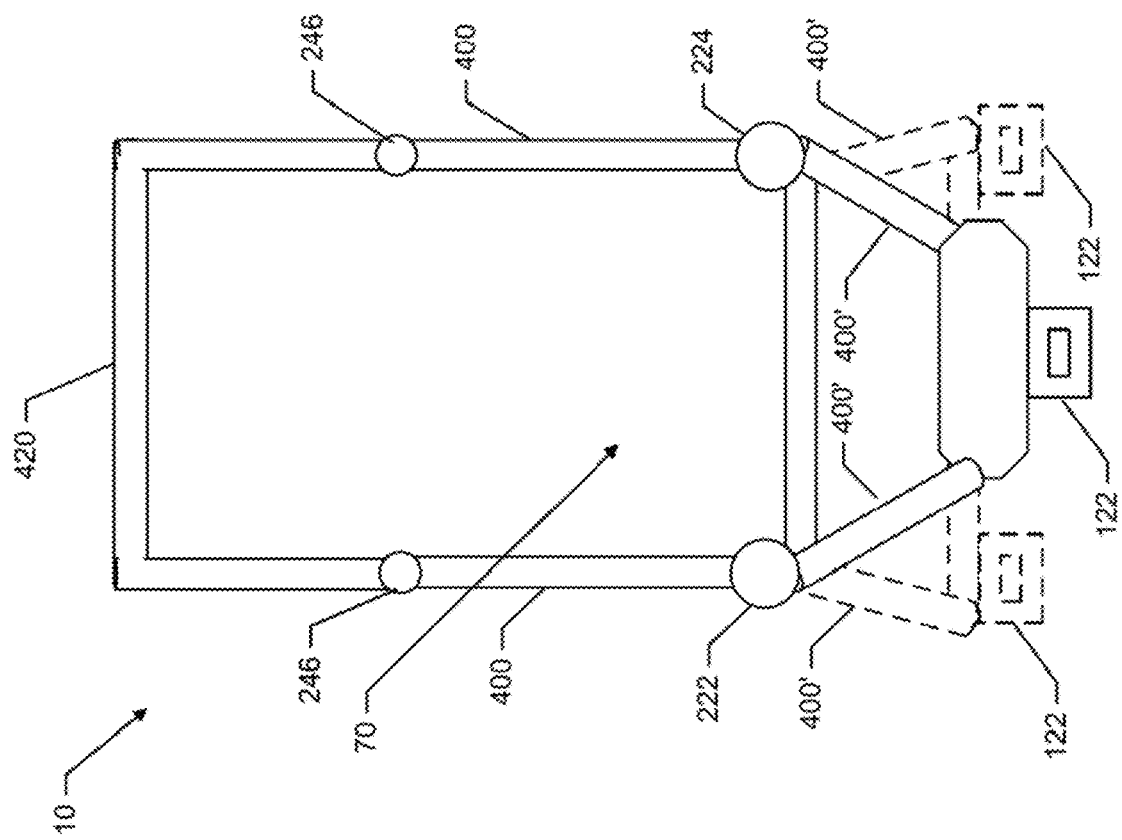
FIG. 3 illustrates a diagrammatic representation of an assembled stroller in accordance with an example embodiment.

As discussed above, the stroller 10 illustrated in FIG. 1 may be only one stroller configuration assembled from a stroller assembly of an example embodiment contained herein. FIG. 2 illustrates a block diagram of a stroller assembly that may be provided to enable the assembly of a child or infant stroller in a plurality of configurations. FIGS. 3-9 illustrate further configurations of a stroller that may be assembled from the components of the stroller assembly illustrated in FIG. 2.

In accordance with an example embodiment shown in FIG. 2, the stroller assembly 200 may include a base assembly 220, an upper frame assembly 240, a lower frame assembly 260, a first seat assembly 280, a handlebar assembly 300, and a mobility assembly 320. It should be understood that the stroller assembly 200 may include a plurality of different components that can be assembled in a variety of different configurations. In this regard, it is obvious that a component of each assembly of FIG. 2 is different that a component of any other assembly by virtue of the very different forms and functions of the different assemblies. Thus, when referring to "different components" within the context of example embodiments, the intent is to convey that the different components are different instances of components within a particular assembly that results in the same assembly having the potential for instantiation in a number of different forms (and possibly also having different functions). Thus, for example, different components may be used for the handlebar assembly 300 in corresponding different configurations resulting in a different form for the handlebar assembly 300 with or without different functions. Again, for example, the handlebar assembly 300 in one instance may include the hinged handle 100 of FIG. 1, and in another instance may include a handle that is telescoping, or not hinged (or capable of pivoting or telescoping) at all. Combinations of features are also possible. In such example, both the form and function of the handle changes when the different components are changed. However, it is also possible that different components could be used for two different hinged (or non-hinged) handles as well, resulting in the possibility to define different configurations of the stroller assembly 200 using different components that could have the same or different functions for reach respective constituent assembly. In some cases, different styles (e.g., style A and style B), which may be defined by the different shapes, colors, padding materials, etc., may also be definable for the handlebar assembly 300. Accordingly, the stroller assembly 200 demonstrated in FIG. 2 may be used to construct multiple configurations of at least a three-wheel single seat stroller or a four-wheel single seat stroller such as those stroller configurations demonstrated in FIG. 1 and FIGS. 3-9. The assembled stroller (e.g., assembled stroller 10 of FIG. 1) is therefore one expression of the many possible expressions that can be formed from the stroller assembly 200. In this regard, each individual expression (i.e., each finally assembled stroller) is a collection of selected components and therefore a collection of the individual expressions chosen for each of the constituent assemblies that make up the stroller assembly 200. Within each constituent assembly, selections are made to define an expression for the constituent assembly, and then the assembled stroller 10 can be put together from all selected components that form each respective one of the constituent assemblies.

As shown in FIG. 2, the base assembly 220 may be the foundation of the stroller assembly 200 and may serve as an attachment point of components of the stroller assembly 200. In this regard, components of the upper frame assembly 240 and lower frame assembly 260 may be configured to be attached to the components of the base assembly 220. In some cases, the base assembly 120 may include components that are configured to be a first base portion 222 and a second base portion 224 (see FIGS. 3 and 4). The first base portion 222 may be configured to be disposed on a first side of an assembled stroller 10 (e.g., a right side in relation to the user pushing an assembled stroller 10 of the stroller assembly 200), and the second base portion 224 may be configured to be disposed on a second side of the assembled stroller 10 (e.g., a left side in relation to the user pushing the assembled stroller 10 of the stroller assembly 10).

Furthermore, the first base portion 222 and the second base portion 224 may be components that are mirror images or duplicates of each other, and when the stroller assembly 200 has been assembled, the first base portion 222 and the second base portion 224 may facilitate the folding or collapsing of the assembled stroller 10 into a collapsed configuration or the unfolding of the assembled stroller 10 from the collapsed configuration. Therefore, the first base portion 222 and the second base portion 224 of the base assembly 200 may be a hinge assembly, such as the first hinge assembly 20 illustrated in FIG. 1, or any other pivoting mechanism that enables the folding and unfolding of the assembled stroller 10. For example, the first base portion 222 and the second base portion 224 may enable the assembled stroller to fold in the direction demonstrated by line 230 in FIG. 8. Thus, the first base portion 222 and the second base portion 224 may form pivot points about which components of the upper frame assembly 240 and the lower frame assembly 260, for example, may rotate, pivot, swing, or articulate in order to achieve the folding or collapsing of the assembled stroller 10. As mentioned above, the first base portion 222 and the second base portion 224 may each include or be embodied as a hinge. This hinge may be any hinge configured to enable the rotation, pivoting, swinging, or articulating of the assembled stroller 10. As such, it should be appreciated that the selection of the first and second base portions 222 and 224, effectively defines a significant constraint on the stroller assembly 200 in relation to how the stroller assembly 200 will ultimately fold. Moreover, the lengths of the links and locations of the pivot points for any particular expression of the stroller assembly 200 (i.e., in the form of a particular collection of components for each of the constituent assemblies) will impact the folding and unfolding characteristics of the assembled stroller.

As shown in FIG. 2, the base assembly 220 may be the foundational constituent assembly among all the assemblies the combine to form the stroller assembly 200. The designer may make component selections to define a form of expression for the base assembly 200. For example, the designer may select between tube option A or tube option B for different tube shapes, sizes, materials, lengths, etc. The designer may also select between hinge design A and hinge design B to define the type of fold and possibly also influence the weight and construction of the remainder of the stroller assembly 200 based on the robustness selected for this foundation of the stroller assembly 200. In some cases, one or more instances of an adaptive coupler 221 may be provided on the base assembly 220 to enable various components of the base assembly 220 to interface or mate with various other components of either the base assembly 220 or of other constituent assemblies. For example, in some cases, the adaptive couplers 221 may be selected based on the hinges or tubes desired to enable individual components to mate (via the adaptive couplers 221) to other selected components. However, the adaptive couplers 221 may also facilitate engagement of one constituent assembly to another constituent assembly in some cases.

The upper frame assembly 240 of the stroller assembly 200 may include a plurality of components used for assembling an upper frame, such as the upper frame 40 illustrated in FIG. 1, of the assembled stroller 10. Thus, the upper frame assembly 240 may include components that are configured to be operably coupled to the components of the base assembly 200. In this regard, the upper frame assembly 240 may include a plurality of tubular arms such as the tubular arms 400 demonstrated in FIGS. 3-8. The tubular arms 400 may, in some cases, be substantially rigid tubular arms. Furthermore, the plurality of tubular arms 400 may include tubular arms 400 in a variety of shapes, lengths and widths to enable the assembly of the stroller 10 in a desired height or width. For example, the plurality of tubular arms 400 of the upper frame assembly 240 may include tubular arms 400 configured to be used as the front upper frame portion 42 or the rear upper frame portion 44 of the assembled strollers demonstrated in FIGS. 1 and 5-7 or an extension portion 46 demonstrated in FIG. 8. The tubular arms 400 may be selected to have a material (e.g., composite materials, aluminum, etc.) of choice that will impact strength and weight of the stroller assembly 200 as well as different shapes and lengths. For example, the tubular arms 400 could be selected to include tubes (e.g., tube option A or tube option B) that have a rounded rectangular cross section, an oval cross section, or any other desirable shape. To enable the substitution of different tube shapes, lengths, materials, etc., each of the components within any given assembly that is interchangeable with another component must have the ability to interface with a consistent set of adaptive couplers 221. Thus, for example, each of the first and second base portions 222 and 224 (i.e., hinge portions) may have a socket to which the corresponding tubular arms 400 mate. The sockets of each of the first and second base portions 222 and 224 may each have one consistent interface to mate with the first and second base portions 222 and 224, while having selectable different tube interfaces (i.e., matching the shape of the tubular arms 400) to enable different tubes to be mated therewith. Thus, in such example, the adaptive couplers 221 could have a consistent interface with one component (i.e., the socket for mating with the first and second base portions 222 and 224), but a selectable and different interface with another (i.e., with the tubular arms 400) to allow interchangeability of components (i.e., selection of different shaped arms). As an alternative, the adaptive couplers 221 may be embodied as consistently shaped sockets that can have adapters plugged therein or mated therewith to enable the other side of such adapters to mate with any different desirable shape or type of component. Thus, for example, an adapter could mate with the socket and a particular different adapter could be selected to interface between the first and second base portions 222 and 224 and each respective different option for the tubular arms 400. The adapter may include different interfaces and/or different lengths of components.

Figure 8:
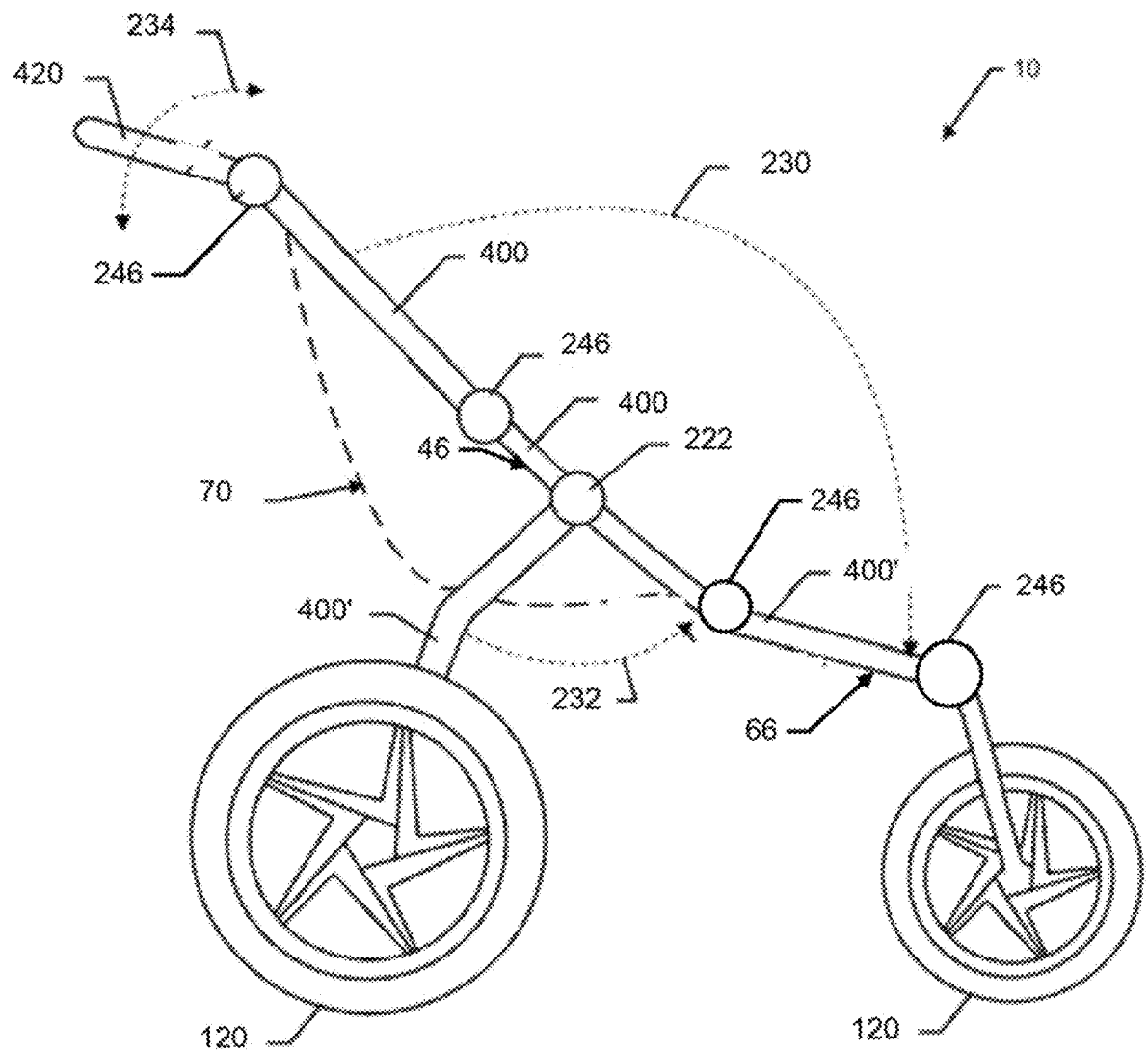
FIG. 8 illustrates a side perspective view of an assembled stroller in accordance with an example embodiment.

In this regard in order to achieve the desired height of the upper frame 40, some tubular arms 400 may be configured to be used as the extension portion 46 (see FIG. 8). Thus, it should be understood that the tubular arms 400 may be joined together to achieve the desired height of the upper frame 40. Accordingly, the components of the upper frame assembly 240 may include joint members that are configured to act as the adaptive couplers 221 described above. For example, the joint member 246 demonstrated in FIG. 8, which enables the upper frame 40 to extend to a desired height. This joint member 246 may be a hinge, such as any one of the hinge assemblies 20, 22, 24, 26 described in relation to FIG. 1, or the joint member 246 may be an adapter that is configured only to couple or join one tubular arm 400 to another tubular arm 400 or to a hinge. Accordingly, the components of the upper frame assembly 240 may enable the upper frame 40 to be configured in numerous configurations based on the selection of hinges and tube components having desired characteristics, with the use of adaptive couplers that enable interconnection of each of the different hinge/tube options.

To be assembled as the upper frame 40 of any of the assembled strollers 10 demonstrated in FIGS. 3-8, each of the tubular arms 400 included in the upper frame assembly 240 may be configured to have a duplicate tubular arm 400 such that the upper frame 40 of the assembled stroller 10 has a duplicate right and left side. Regardless of whether the desired configuration of the stroller 10 includes only the front upper frame portion 42 or includes any of the front upper frame portion 42, the rear upper frame portion 44, or the extension portion 46, when assembling the stroller assembly 200 into the assembled stroller 10, one tubular arm 400 of the plurality of tubular arms 400 of the upper frame assembly 240 may be configured to be operably coupled to the first base portion 222 and a duplicate tubular arm 400 may be configured to be operably coupled to the second base portion 224. In this regard, two duplicate tubular arms 400 of the upper frame assembly 240 may be configured to be operably coupled to a respective first end of the first base portion 222 and the first end of the second base portion 224. Additional tubular arms 400 of the upper frame assembly 240 used to assemble the desired upper frame 40 arrangement may also be coupled directly to the first base portion 222 or the second base portion 224 or may be operably coupled to a portion of the other tubular arms 400 utilized in assembling the upper frame 40. Thus, the selected components of the upper frame assembly 240 may be configured to be assembled such that the receiving space 70 is defined between the duplicate tubular arms 400 operably coupled to the first base portion 222 and the second base portion 224. As mentioned above, the receiving space 70 may enable components of the first seat assembly 280 to be inserted into or operably coupled to the upper frame 40.

As mentioned above, the matching or duplicate tubular arms 400 of the upper frame assembly 240 selected to be operably coupled to the first base portion 222 and the second base portion 224 may be pivotally coupled to the respective first base portion 222 and the second base portion 224 to enable the assembled stroller 10 to be collapsed to the folded position. Furthermore, the upper frame assembly 240 may also include adapters or the joint members 246 (as examples of adaptive couplers 221) such that if the selected tubular arms 400 have a width or diameter not adapted to be directly coupled to either of the first base portion 222, the second base portion 224, or other tubular arms 400, the adapters or joint members 246 may be coupled to an end of the tubular arm 400 to enable the coupling of the tubular arm 400 to the first end of first base portion 222, the second base portion 224, or the other tubular arms 400 of the upper frame assembly 240.

As the upper frame assembly 240 includes a variety of tubular arms 400 in varying lengths and widths, it should be understood that the upper frame assembly 240 may include tubular arms 400 that may not necessarily be utilized during the assembly of a particular assembled stroller 10. Rather, only certain tubular arms 400 may be utilized based on the desired configuration of the assembled stroller 10. Effectively, the assembled stroller 10 becomes the selected embodiment from a kit of potentially selectable parts that are interchangeable with each other.

The stroller assembly 10 may further include a lower frame assembly 260. The lower frame assembly 260 may include a plurality of components used for assembling a lower frame, such as the lower frame 60 illustrated in FIG. 1., of the assembled stroller 10. Thus, the lower frame assembly 260 may include components that are configured to be operably coupled to the components of the base assembly 200 as the base assembly 200 may be configured to operably couple the lower frame 60 to the upper frame 40 of the assembled stroller 10. In this regard and similar to the upper frame assembly 240, the lower frame assembly 260 may include a plurality of tubular arms 400'. The tubular arms 400' may, in some cases, be substantially rigid tubular arms. Furthermore, the plurality of tubular arms 400' may include tubular arms 400' in a variety of materials, shapes, lengths and widths to enable the assembly of the stroller 10 in a desired height or width, and/or with a particular style. For example, the plurality of tubular arms 400 of the lower frame assembly 260 may include tubular arms 400' configured to be used as the front lower frame portion 62 or the rear lower frame portion 64 of the assembled strollers demonstrated in FIGS. 1 and 5-8. In a similar manner as the upper frame 40, some of the tubular arms 400' may also be configured to be an extension portion 66 of the lower frame 60 (see FIG. 8).

Figure 4:
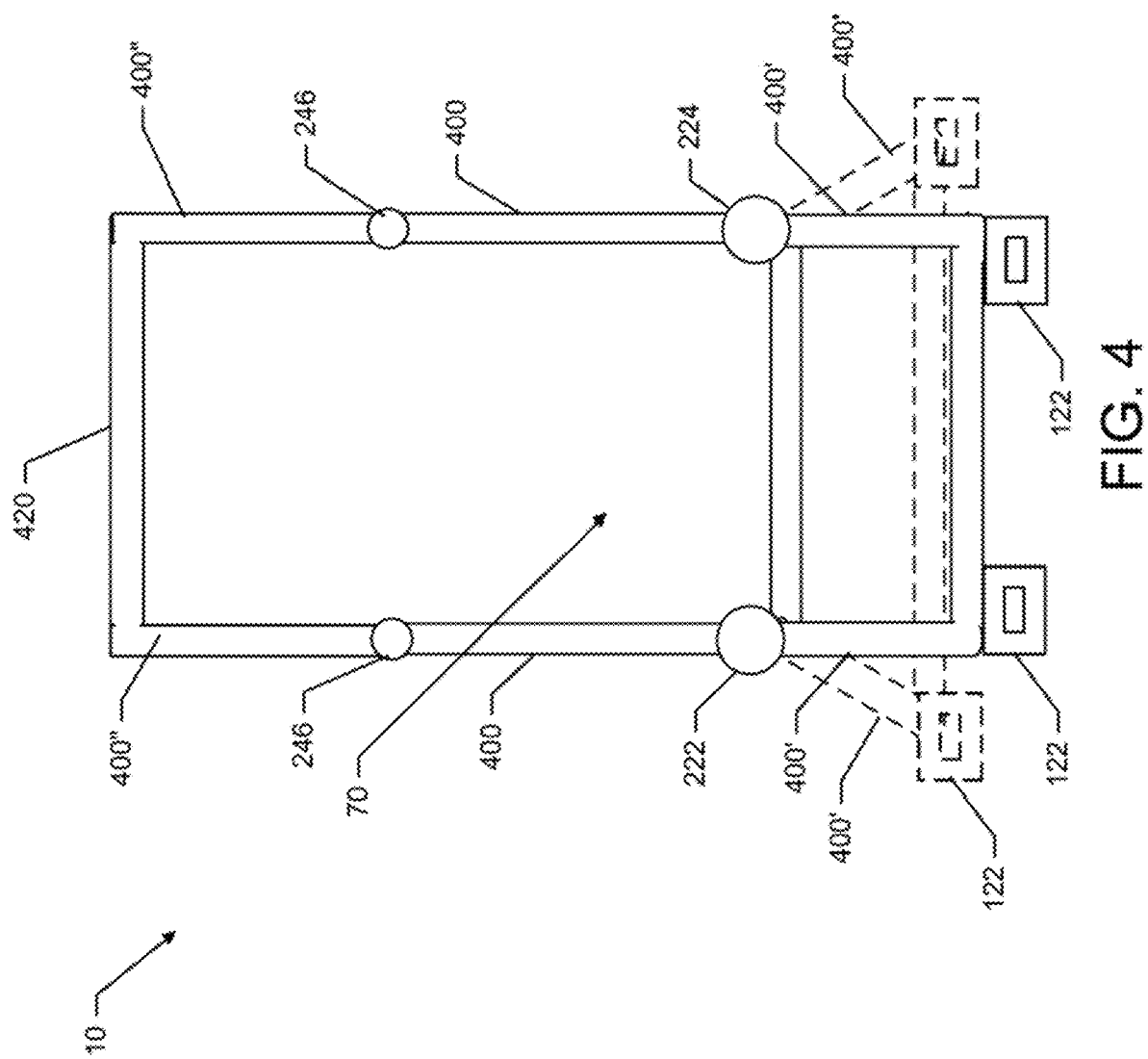
FIG. 4 illustrates a diagrammatic representation of an assembled stroller in accordance with an example embodiment.

In this regard, tubular arms 400' may be joined together to achieve the desired style, height or width of the lower frame 60. Accordingly, similar to the upper frame assembly 240, the components of the lower frame assembly 260 may include joint members 246 that enable the lower frame 60 to extend to a desired height or width. This joint members 246 may be hinges, such as any one of the hinge assemblies 20, 22, 24, 26 described in relation to FIG. 1, or the joint members 246 may be an adapter that is configured only to couple or join one tubular arm 400' to another tubular arm 400' or to any of the hinges or other components or assemblies of the stroller assembly 200. Thus, again, the joint members 246 are examples of adaptive couplers 221 that can enable different components to be substituted within each constituent assembly of the stroller assembly 200. Accordingly, the components of the lower frame assembly 260 may enable the lower frame 60 to be configured in numerous configurations. In this regard, the expression of FIG. 3 may be for the selection of tube options that include a front fork that forms a support for a single front wheel. Meanwhile, the expression of FIG. 4 is for a stroller assembly 200 chosen to include two front wheels. In each case, the different fork options or tube options may be supported by corresponding adaptive couplers 221 that may enable each one of the options to be exchanged for another. Moreover, in some cases, the adaptive couplers 221 may enable any particular expression of the lower frame assembly 260 to mate with the base assembly 220, the mobility assembly 320 (or other constituent assemblies such as the second seat assembly 500 of FIG. 9 or the storage assembly 600 of FIG. 10).

To be assembled as the lower frame 60 (which is a set of components from the lower frame assembly 260 that define one particular expression of the lower frame assembly 260) of any of the assembled strollers 10 demonstrated in FIGS. 3-8, each tubular arm 400' of the lower frame assembly 260 may be configured to have a duplicate tubular arm 400' such that the lower frame 60 of the assembled stroller 10 is enabled to have a duplicate right and left side if desired. It should be understood, however, that other example embodiments may not have duplicate right and left sides, but rather the lower frame 60 may be configured any configuration desired with the components of the lower frame assembly 260. Regardless of whether the desired configuration of the stroller 10 includes only one of the front lower frame portion 62 or the rear lower frame portion 64 or includes both of the front lower frame portion 62 and the rear lower frame portion 64, when assembling the stroller assembly 200 into the assembled stroller 10, one tubular arm 400' of the plurality of tubular arms 400' of the lower frame assembly 260 may be configured to be operably coupled to the first base portion 222 and a duplicate tubular arm 400' may be configured to be operably coupled to the second base portion 224. In this regard, two duplicate tubular arms 400' of the lower frame assembly 260 may be configured to be operably coupled to a respective second end of the first base portion 222 and the second end of the second base portion 224, in some cases, via respective instances of adaptive couplers. As such, the joint members 246 may be specific examples of adaptive couplers 221 that enable effective tube lengths to be extended and/or enable the same or different sizes of tubes to be selected for mating with each other to define a desired composite length. However, other adaptive couplers 221 may also be used to attach the tubular arms to the hinges or other components or constituent assemblies of the stroller assembly 200. Additional tubular arms 400' of the lower frame assembly 260 used to assemble the desired lower frame 60 arrangement may be also be coupled directly to the first base portion 222 or the second base portion 224 (see FIG. 8) or may be operably coupled to a portion of the other tubular arms 400' utilized in assembling the lower frame 60 (see FIGS. 5-7). In cases, where the tubular arms 400' of the front lower frame portion 62 and the rear lower frame portion 64 are operably coupled to the first base portion 222 and the second base portion, the first base portion 222 and the second base portion 224 may enable the front lower frame portion 62 and the rear lower frame portion 64 to fold in the direction demonstrated by line 232 in FIG. 8.

Furthermore, the selected components of the lower frame assembly 260 may be configured to be assembled such that a second seat 90 or storage compartment 140 is configured to be placed between components operably coupled to the first base portion 222 and the second base portion 224 or between the tubular arms 400' of the front lower frame portion 262 and the rear lower frame portion 264 as described below in reference to FIGS. 9 and 10.

As mentioned above, the tubular arms 400' of the lower frame assembly 260 selected to be operably coupled to the first base portion 222 and the second base portion 224 may be pivotally coupled to the respective first base portion 222 and the second base portion 224 to enable the assembled stroller 10 to be collapsed to the folded position. Furthermore, the lower frame assembly 260 may also include adaptive couplers 221 or joint members 246 such that if the selected tubular arms 400 have a width or diameter not adapted to be directly coupled to either of the first base portion 222, the second base portion 224, or other tubular arms 400', the adaptive couplers 221 or joint members 246 may be coupled to an end of the tubular arm 400' to enable the coupling of the tubular arm 400' to the first end of first base portion 222, the second base portion 224, or the other tubular arms 400'.

As the lower frame assembly 260 includes a variety of tubular arms 400' in varying lengths and widths, it should be understood that the lower frame assembly 260 may include tubular arms 400' that may not necessarily be utilized during the assembly of a particular assembled stroller 10. Rather, only certain tubular arms 400' may be utilized based on the desired configuration of the assembled stroller 10.

As shown in FIG. 2, the stroller assembly 200 may also include a first seat assembly 280. The first seat assembly 280 may include components that allow for the operably coupling of a first seat, such as the first seat 80 illustrated in FIG. 1, to a portion of the upper frame 40, the lower frame 60, or a combination thereof. These components of the first seat assembly 280 may, for example, include a pair of sockets 82, such as the socket 82 illustrated in FIG. 1, that allow for the removable coupling of the first seat 80. It should be understood that the first seat 80 configured to be coupled to the socket 82 may be any infant or child seat that the user desires to attach to the stroller 10 as long as the seat is configured to fit or lock within the sockets 82. In other cases, however, the components of the first seat assembly 280 may include a plurality of first seats 80 and a portion of the first seat 80 may be configured to directly attach to the upper frame 40 or lower frame 60 of the assembled stroller 10. The plurality of first seats 80 may be any infant seat or carriers, children seat or carrier, bassinet, or the like known in the art. Accordingly, the components of the first seat assembly 280 may include a plurality of first seats 80, a plurality of sockets 82, or a combination thereof. Different instances of the individual parts of the first seat assembly 280 (e.g., the material, the form, the colors, the accessories, the frame size/shape, etc.) may be selectively matched to define a particular design or expression for the first seat assembly 280. Some representative options are shown in FIG. 2. As such, like the base assembly 220, the upper frame assembly 240 and the lower frame assembly 260, the first seat assembly 280 may be a constituent assembly (or module) of the stroller assembly 200 that is able to be individually tailored to any desired design elements that can then be combined with other constituent assemblies (or modules) to form the assembled stroller 10 (or an alternative design). In this regard, selection of individual options/components from among the plurality of component options that define the first seat assembly 280 will result in a particular expression for the first seat assembly 280 and that expression can be combined with other constituent assemblies of the stroller assembly 200 to define an assembled stroller (e.g., assembled stroller 10 of FIG. 1). The options/components may be mated together or to other constituent assemblies via adaptive couplers 221.

Furthermore, the stroller assembly 200 may include a handlebar assembly 300 that is also an individually configurable constituent assembly (or module) of the stroller assembly 200. The handlebar assembly 300 may include components to enable the steering and driving of the assembled stroller 10, such as the handle 100 illustrated in FIG. 1. Thus, the handlebar assembly 300 may include components that are configured to be operably coupled to the components of the upper frame assembly 240. In this regard, the handlebar assembly 300 may include a plurality of handle portions 420 or a plurality of tubular arms such as the tubular arms 400" configured to be assembled as the handle 100. The plurality of handle portions 420 and tubular arms 400" may include handle portions 420 or tubular arms 400" in a variety of styles, shapes, materials, lengths and widths to enable the assembly of the stroller 10 in a desired configuration.

Similar to the upper frame assembly 240 or the lower frame assembly 260, the tubular arms 400" may serve as an extension portion to enable the handle 100 to be adjusted to an increased height to enable ease of use. Further, the components of the handlebar assembly 300 may include joint members 246 that enable the coupling of the handle portions 420 to the upper frame 40 or, in some cases, the coupling of the handle portions 420 to any extension portion utilized. This joint member 246 may be a hinge, such as any one of the hinge assemblies 20, 22, 24, 26 described in relation to FIG. 1, or the joint member 246 may be an adapter that is configured only to couple or join one tubular arm 400" to another tubular arm 400 or handle portion 420. When the joint member 246 operably couples components of the handlebar assembly 300 to the components of the upper frame assembly 240, the joint member 246 may enable the rotation of the assembled handle 100 in the direction demonstrated by line 234 in FIG. 8. Accordingly, the components of the handlebar assembly 300 may enable the handle 100 to be configured to be numerous configurations.

Figure 5:
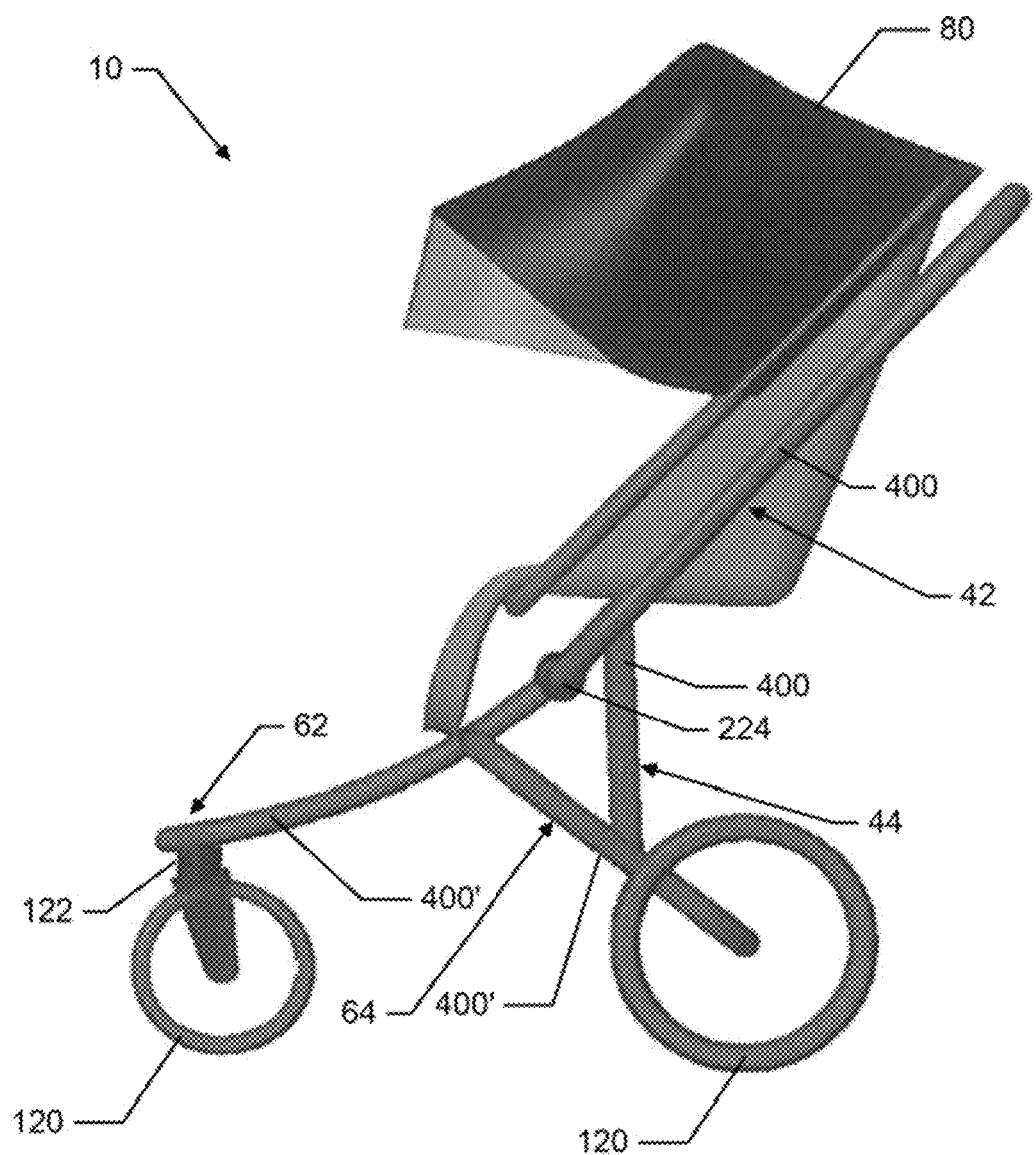
FIG. 5 illustrates a side perspective view of an assembled stroller in accordance with an example embodiment.
Figure 6:
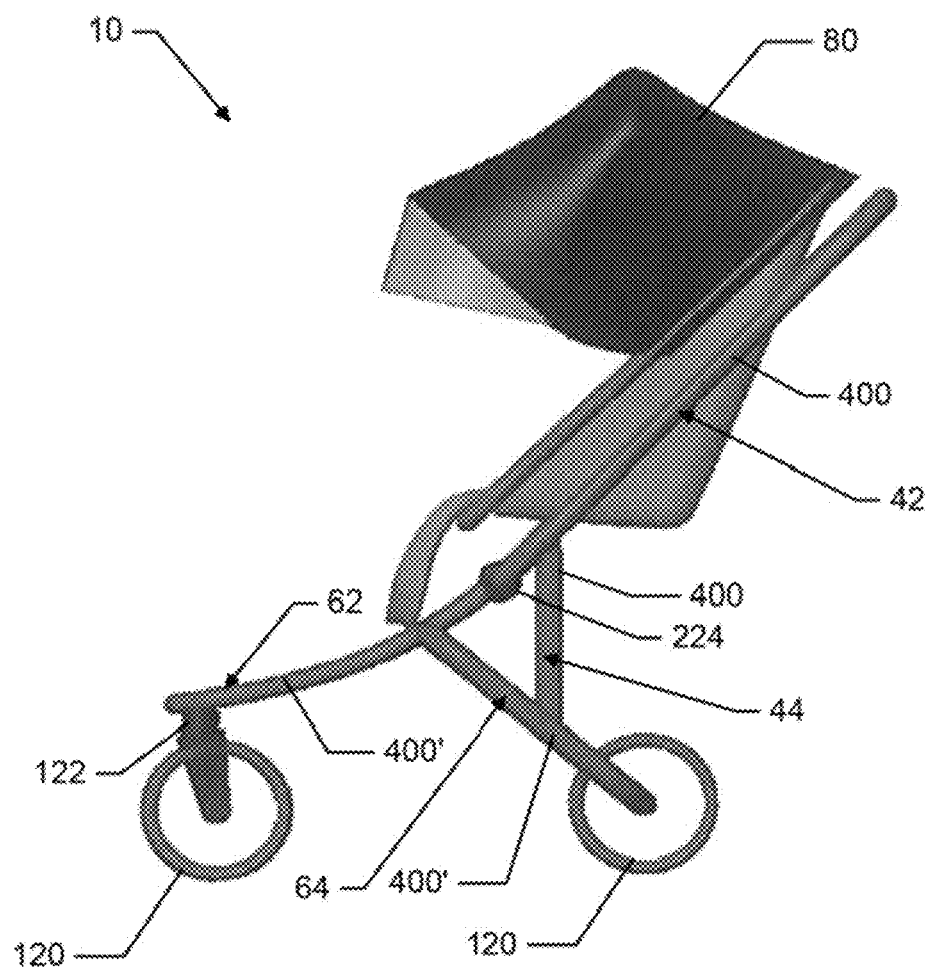
FIG. 6 illustrates a side perspective view of an assembled stroller in accordance with an example embodiment.
Figure 7:
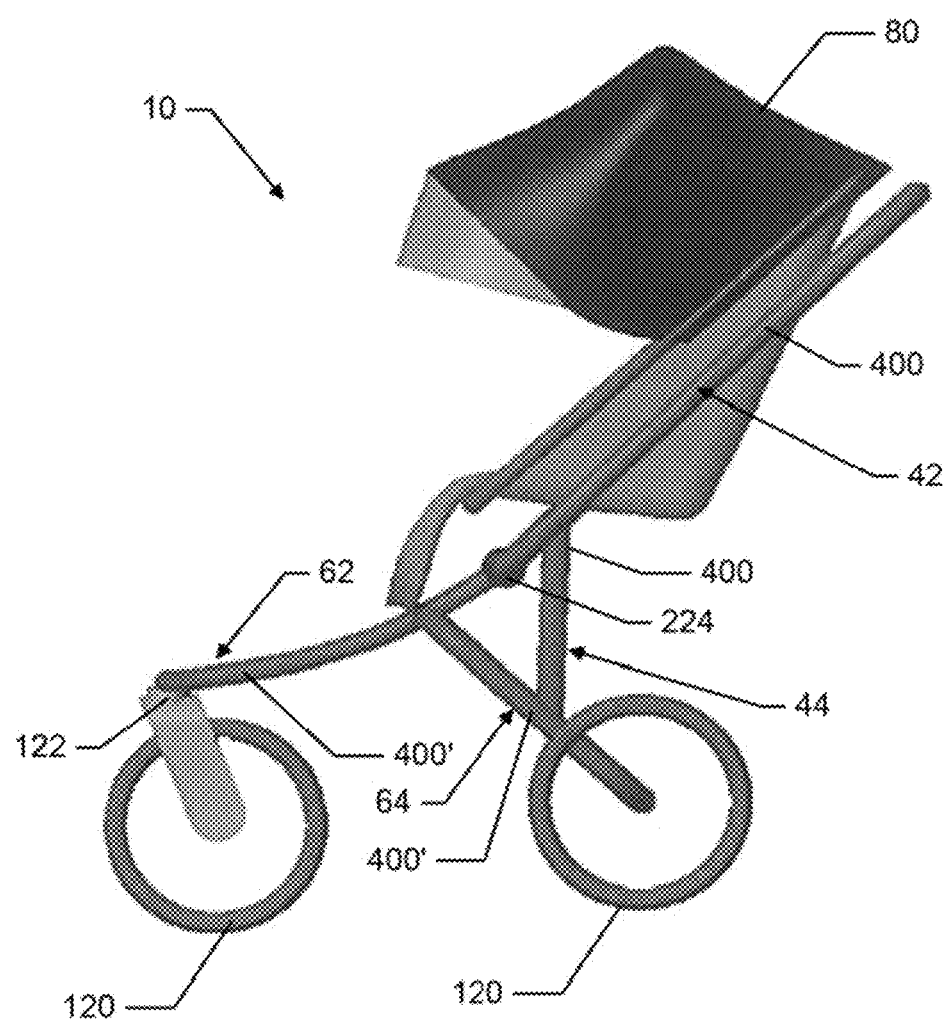
FIG. 7 illustrates a side perspective view of an assembled stroller in accordance with an example embodiment.

As illustrated in FIG. 2, the stroller assembly 200 may also include a mobility assembly 320. The mobility assembly 320 may include components to enable the driving of the assembled stroller 20, such as the wheels 120 illustrated in FIG. 1. Accordingly, the components of the mobility assembly 320 may include a variety of styles, materials, shapes and sizes of wheels 120 and components to enable the attachment of the wheels 120 to the lower frame 60. The components configured to enable the attachment of the wheels 120 to the lower frame may include the wheels supports 122 demonstrated in FIGS. 3-7. The plurality of wheel supports 122 included in the plurality of components may be wheels supports 122 that enable the wheel 120 to rotate relative to the frame to which the wheel support 122 is attached or wheel supports 122 that maintain the wheel 120 in a fixed orientation, adjustable wheels, wheels with various different wheeor any combination thereof. It should be understood, however, that any of the plurality of wheels 120 included in the plurality of components may be configured to be attached directly to the lower frame 40. Furthermore, the plurality of wheels 120 may be configured to be attached to any portion of the lower frame 40. For example, as shown in FIG. 5, a smaller wheel 120 may attached to the front lower frame portion 62 relative to the larger wheel 120 attached to the rear lower frame portion 64. However, as shown in FIGS. 6 and 7, similarly sized wheels 120 are each attached to the front lower frame portion 62 and the rear lower frame portion 64. Additionally, the components of the mobility assembly 320 may also include components configured to be used as a corresponding brake assembly that may be disposed proximate to a wheel 120 of the mobility assembly. Thus, for example, different wheel options may be selected to define an expression for the stroller assembly 200 to be embodied in an assembled stroller (e.g., the assembled stroller 10 of FIGS. 1, 5-8 and 11). Different wheel braking mechanisms, wheel types (e.g., caster wheels), different bearings, and/or different wheel release joints may also be substituted for each other as different selectable components that can be an expression of the mobility assembly 300.

Figure 9:
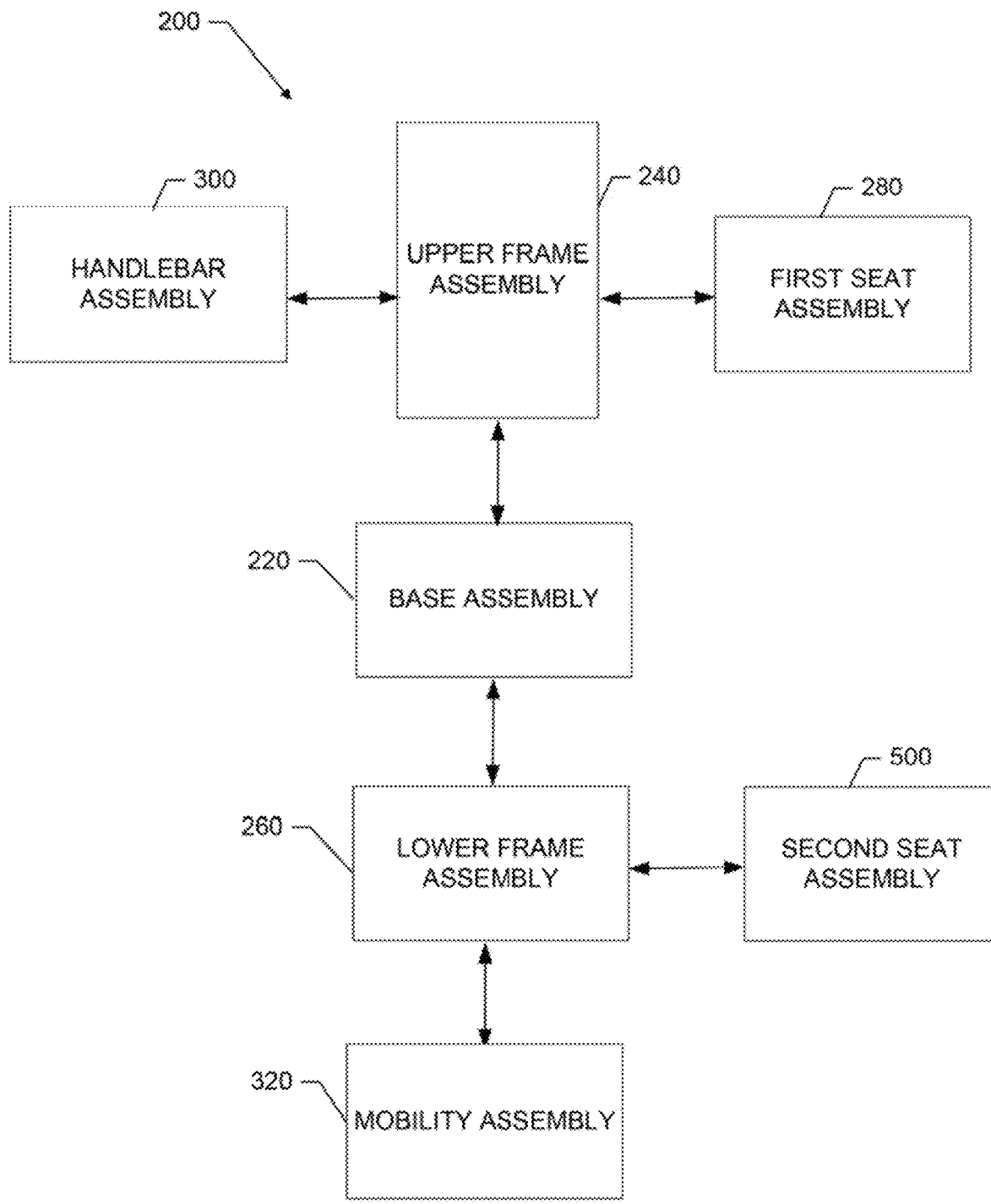
FIG. 9 illustrates a block diagram of a stroller assembly in accordance with an example embodiment.
Figure 11:
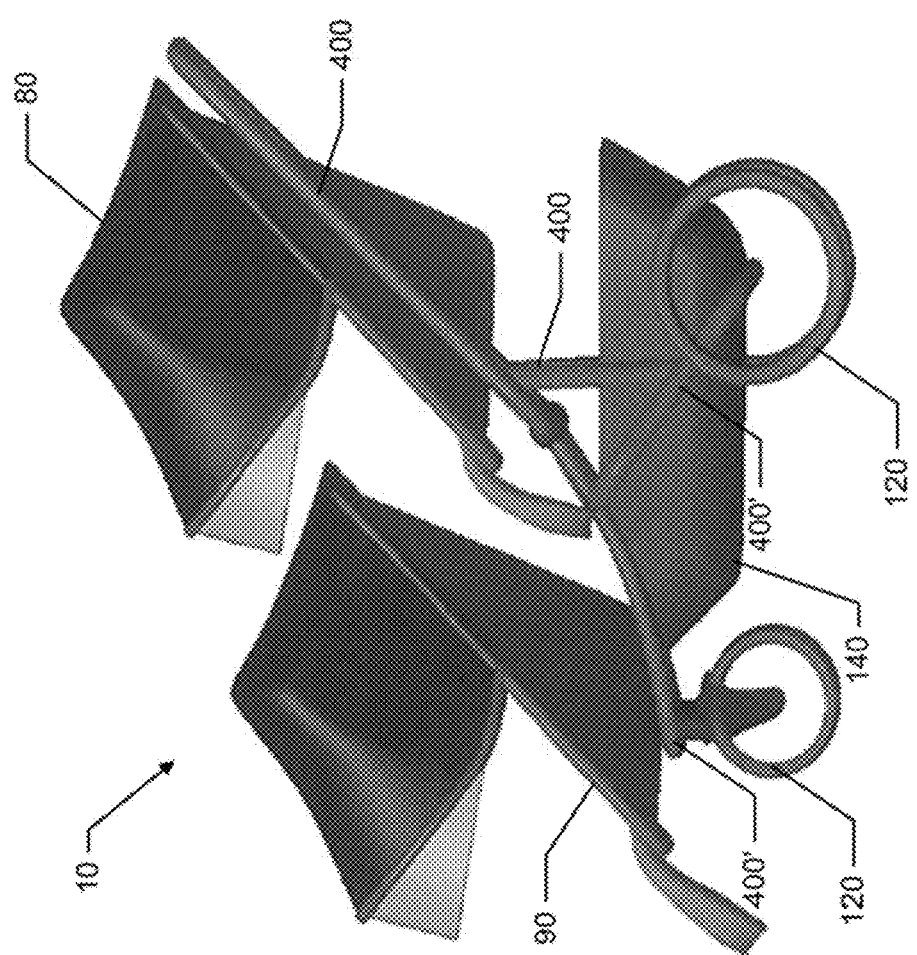
FIG. 11 illustrates a side perspective view of an assembled stroller in accordance with an example embodiment.

FIG. 9 illustrates the stroller assembly 200 in accordance with a further example embodiment contained herein. Furthermore, FIG. 11 illustrates a configuration of a stroller 10 that may be assembled from the components of the stroller assembly illustrated in FIG. 9. As shown in FIG. 9, the stroller assembly 200 may include the components discussed in relation to FIG. 2 but also include the addition of a second seat assembly 500. The second seat assembly 500 may include components that allow for the operable coupling of a second seat, such as the second seat 90 illustrated in FIG. 11, to a portion of the lower frame 60. These components of the second seat assembly 500, similar to the first seat assembly 280 may, for example, include a pair of sockets 82 that allow for the removable coupling of the second seat 90. It should be understood that the second seat 90 configured to be coupled to the socket 82 may be any infant or child seat that the user desires to attach to the stroller 10 as long as the seat is configured to fit or lock within the sockets 82. In other cases, however, the components of the second seat assembly 500 may include a plurality of second seats 90 and a portion of the second seat 90 may be configured to directly attach to the lower frame 60 of the assembled stroller 10. The plurality of second seats 90 may be any infant seat or carriers, children seat or carrier, or the like known in the art. Accordingly, the components of the second seat assembly 500 may include a plurality of options with respect to selection of specific sizes, types, styles, etc., of second seats 90, sockets 82, or a combination thereof. Furthermore, while FIG. 11 illustrates the second seat 90 attached in front of the first seat 80 relative to the user standing at the handle 100 or, in other words, at a distal end of the stroller 10 in relation to the handle 100, the second seat 90 may be configured to be attached behind the first seat 80 relative to the user standing at the handle 100.

Figure 10:
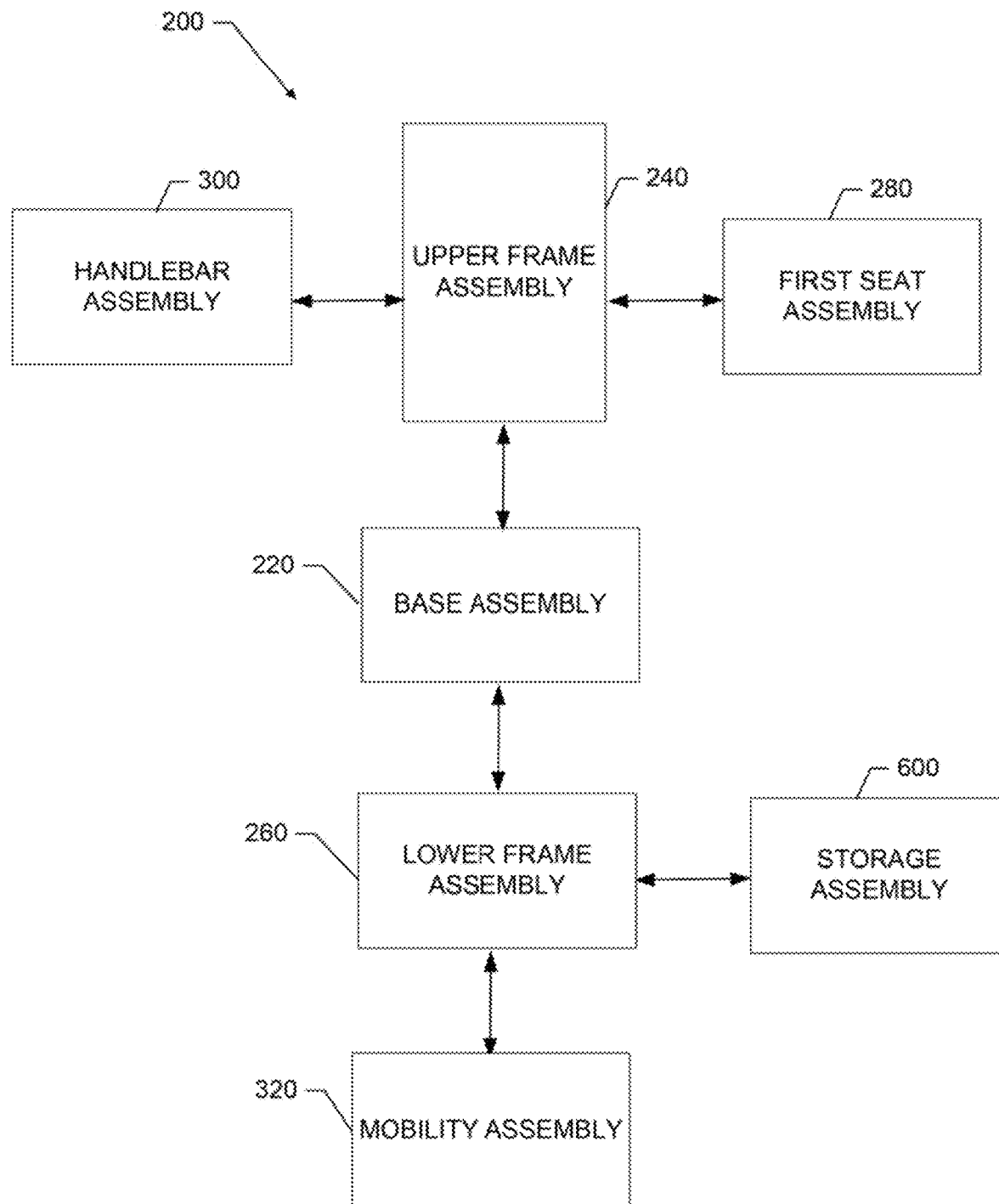
FIG. 10 illustrates a block diagram of a stroller assembly in accordance with an example embodiment.

FIG. 10 illustrates a stroller assembly 200 in accordance with a further example embodiment contained herein. Furthermore, FIG. 11 illustrates a configuration of the stroller 10 that may be assembled from the components of the stroller assembly illustrated in FIG. 10. As shown in FIG. 10, the stroller assembly 200 may include the components discussed in relation to FIG. 2 but also include the addition of a storage assembly 600. The storage assembly 600 may include components that allow for the operable coupling of the storage compartment, such as the storage compartment 140 illustrated in FIG. 11, to a portion of the lower frame 60. These components of the storage assembly 600 that allow for the coupling of the storage compartment 140 may be any type of adaptive couplers known in the art, or may be, for example, an additional pair of sockets 82 that allow for the removable coupling of the storage compartment 140. In some cases, however, the storage compartment 140 may be configured to be attached directly to the lower frame 60. Accordingly, the components of the storage assembly 600 may include a plurality of storage compartments 140 and a plurality of components configured to operably couple the storage compartment 140 to the lower frame 60 such as a plurality of sockets 82, or a combination thereof.

While FIGS. 9 and 10 illustrate a stroller assembly 200 including either of a second seat assembly 500 or a storage assembly 600, the stroller assembly 200 may include both the second seat assembly 500 and the storage assembly 600 resulting in an assembled stroller 10 similar to the stroller 10 demonstrated in FIG. 11.

Figure 12:
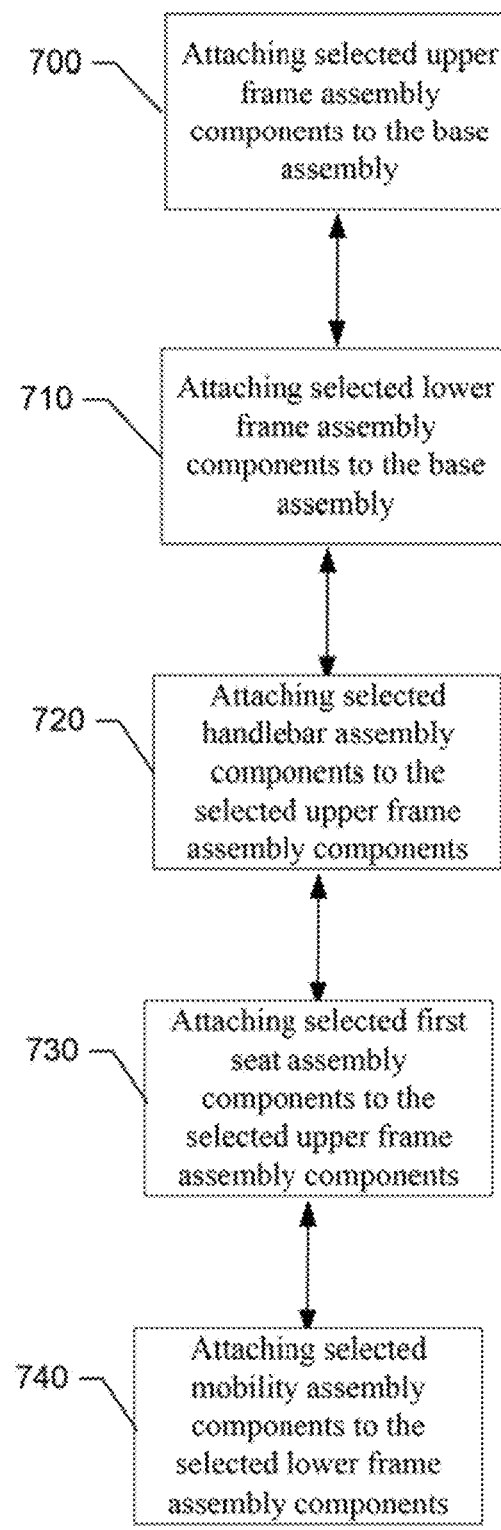
FIG. 12 illustrates a block diagram of a method of assembling a stroller assembly into a stroller in accordance with an example embodiment.

FIG. 12 illustrates a block diagram of a method of assembling a stroller from the components associated with the constituent assemblies of the stroller assembly. The method may include attaching selected upper frame assembly components to the base assembly at operation 700. The method may further include attaching selected lower frame assembly components to the base assembly at operation 710. The method may further include attaching selected handlebar assembly components to the selected upper frame assembly components at operation 720. The method may also include attaching selected first seat assembly components to the selected upper frame assembly components at operation 730. The method may additionally include attaching selected mobility assembly components to the selected lower frame assembly components at operation 740. The method of FIG. 12 may be modified or augmented in some cases. In this regard, in some cases a further optional steps may include attaching selected second seat assembly components to the selected lower frame assembly components or attaching selecting storage assembly components to the selected lower frame assembly components.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A kit of selectable components for manufacture of an assembled stroller, the kit comprising selectable components for each of a plurality of constituent assemblies, the constituent assemblies comprising a base assembly, an upper frame assembly, a lower frame assembly, a handlebar assembly, a mobility assembly, and a first seat assembly;
  wherein the upper frame assembly is coupled to the handlebar assembly, the first seat assembly, and the base assembly in the assembled stroller;
  wherein the lower frame assembly is coupled to the base assembly and the mobility assembly in the assembled stroller;
  wherein the assembled stroller defines a design choice of a plurality of design choices for manufacture of the assembled stroller using selected ones of the selectable components, wherein each design choice includes a different combination of selected ones of the selectable components;

wherein, to manufacture the assembled stroller, each constituent assembly of the assembled stroller is assembled from selected components for that constituent assembly;

wherein the base assembly includes a plurality of adaptive couplers each having a first interface and a second interface, the first interface mating with an interface of the base assembly and the second interface being selectable such that the second interface is configured to mate with each of a plurality of different interfaces of: (1) a plurality of selectable components for the upper frame assembly or (2) a plurality of selectable components for the lower frame assembly;

wherein the selected components for each of the upper frame assembly, the lower frame assembly, and the base assembly comprise at least two selectable components that are interchangeable and different component options for that constituent assembly;

wherein the base assembly comprises a selected set of base assembly components assembled based on the design choice of the assembled stroller, the selected set of base assembly components including one of a first hinge option or a second hinge option different from the first hinge option, and one of a first tube option and a second tube option different from the first tube option;

wherein the upper frame assembly comprises a selected set of upper frame components assembled based on the design choice of the assembled stroller, the selected set of upper frame components including one of a first upper frame tube option and a second upper frame tube option different from the first upper frame tube option;

wherein the lower frame assembly comprises a selected set of lower frame components assembled based on the design choice of the assembled stroller;

wherein the handlebar assembly comprises a selected set of handlebar components assembled based on the design choice of the assembled stroller;

wherein the mobility assembly comprises a selected set of mobility components configured to provide mobility to the assembled stroller and assembled based on the design choice of the assembled stroller; and wherein the first seat assembly comprises a selected set of first seat components configured to enable a first child or infant to be transported by the assembled stroller and assembled based on the design choice of the assembled stroller.

2. The kit of claim 1, wherein the selected set of lower frame components include one of a first lower frame tube option and a second lower frametube option different from the first lower frame tube option.

3. The kit of claim 2, wherein the selected set of handlebar components and first seat components are operably coupled to the plurality of upper frame components, and wherein the selected set of mobility components are operably coupled to the selected set of lower frame components.

4. The kit of claim 1, wherein the constituent assemblies further comprise a second seat assembly, the second seat assembly comprising a selected set of second seat components configured to enable a second child or infant to be transported by the assembled stroller and assembled based on the design choice of the assembled stroller, wherein the selected set of second seat components are operably coupled the selected set of lower frame assembly components.

5. The kit of claim 1, wherein the constituent assemblies further comprise a storage assembly comprising a selected set of storage components assembled based on the design choice of the assembled stroller, wherein the selected set of storage components are operably coupled to the selected set of lower frame components.

6. The kit of claim 1, wherein the first hinge option and the second hinge option each define a different type of fold for the assembled stroller for folding of the upper frame assembly to fold relative to the lower frame assembly.

7. The kit of claim 2, wherein each of the selected set of upper frame components and the selected set of lower frame components comprise selected ones of a plurality of different joint members configured to enable respective different ones of tubular arms to be operably coupled.

8. The kit of claim 1, wherein the selected set of handlebar components comprise a handle selected from the selectable components for the handlebar assembly.

9. The kit of claim 1, wherein the selected set of mobility components comprise a predetermined number of wheels selected from the selectable components for the mobility assembly and operably coupled to the lower frame, and
wherein respective different wheel options have different sizes.

10. The kit of claim 9, wherein the selected set of mobility components comprise a predetermined number of wheel supports selected from the selectable components for the mobility assembly to operably couple the predetermined number of wheels to the lower frame.

11. The kit of claim 2, wherein the lower frame assembly comprises a front lower frame portion and a rear lower frame portion, wherein a predetermined number of selected tubular arms of the plurality of tubular arms form the front lower frame portion and the rear lower frame portion, the selected tubular arms being selected from a group of differently sized tubular arms.

12. The kit of claim 1, wherein the upper frame assembly comprises a front upper frame portion and a rear upper frame portion, wherein a predetermined number of selected tubular arms of the plurality of tubular arms form the front upper frame portion and the rear upper frame portion, the selected tubular arms being selected from a group of differently sized tubular arms.

13. The kit of claim 1, wherein one or more of the constituent assemblies comprise an adaptive coupler configured to enable coupling of differently sized interchangeable component options of selected components for one or more constituent assemblies.

14. A method of manufacturing an assembled stroller having selected components defining a design choice of a plurality of design choices for manufacture of the assembled stroller, wherein each design choice includes a different combination of selected components, the method comprising:

selecting components from a kit of selectable components to assemble each of a plurality of constituent assemblies of the assembled stroller, the constituent assemblies comprising a base assembly, an upper frame assembly, a lower frame assembly, a handlebar assembly, a mobility assembly, and a first seat assembly;
wherein the selectable components for each of the upper frame assembly, the lower frame assembly, and the base assembly comprise at least two different selectable components that are interchangeable component options for that constituent assembly; and
combining the constituent assemblies into the expression design choice of the assembled stroller,
wherein the base assembly comprises a selected set of base assembly components assembled based on the design choice of the assembled stroller, the selected set of base assembly components including one of a first hinge option or a second hinge option different from the first hinge option, and one of a first tube option and a second tube option different from the first tube option;

wherein the base assembly includes a plurality of adaptive couplers each having a first interface and a second interface, the first interface mating with an interface of the base assembly and the second interface being selectable such that the second interface is configured to mate with each of a plurality of different interfaces of: (1) a plurality of selectable components for the upper frame assembly or (2) a plurality of selectable components for the lower frame assembly;

wherein the upper frame assembly comprises a selected set of upper frame components assembled based on the design choice of the assembled stroller, the selected set of upper frame components including one of a first upper frame tube option and a second upper frame tube option different from the first upper frame tube option;

wherein the lower frame assembly comprises a selected set of lower frame components assembled based on the design choice of the assembled stroller;

wherein the handlebar assembly comprises a selected set of handlebar components assembled based on the design choice of the assembled stroller;

wherein the mobility assembly comprises a selected set of mobility components configured to provide mobility to the assembled stroller and assembled based on the design choice of the assembled stroller; and wherein the first seat assembly comprises a selected set of first seat components configured to enable a first child or infant to be transported by the assembled stroller and assembled based on the design choice of the assembled stroller.

15. The method of claim 14, wherein the combining the constituent assemblies comprises:
attaching the selected set of upper frame assembly components to the base assembly;
attaching the selected set of lower frame assembly components to the base assembly;
attaching the selected set of handlebar assembly components to the upper frame assembly;
attaching the selected set of first seat assembly components to the upper frame assembly; and
attaching the selected set of mobility assembly components to the lower frame assembly.

16. The method of claim 15, further comprising attaching the selected set of second seat assembly components to the lower frame assembly.

17. The method of claim 15, further comprising attaching the selected set of storage assembly components to the lower frame assembly.

18. The kit of claim 1, wherein the selectable components for each of the constituent assemblies comprises at least two selectable components that are different and interchangeable component options for that constituent assembly.

19. The kit of claim 1, wherein the selectable components for the handlebar assembly comprises a hinged handle and a non-hinged handle that are different and interchangeable component options for the handlebar assembly; and
wherein the respective kit of selectable components for the mobility assembly comprises a first wheel having a first size and a second wheel having a second size that are interchangeable component options for the mobility assembly.

* * * * *